July 31, 1945.  W. C. EDDY  2,380,829
LENS MOUNTING
Filed Feb. 28, 1942  3 Sheets-Sheet 1
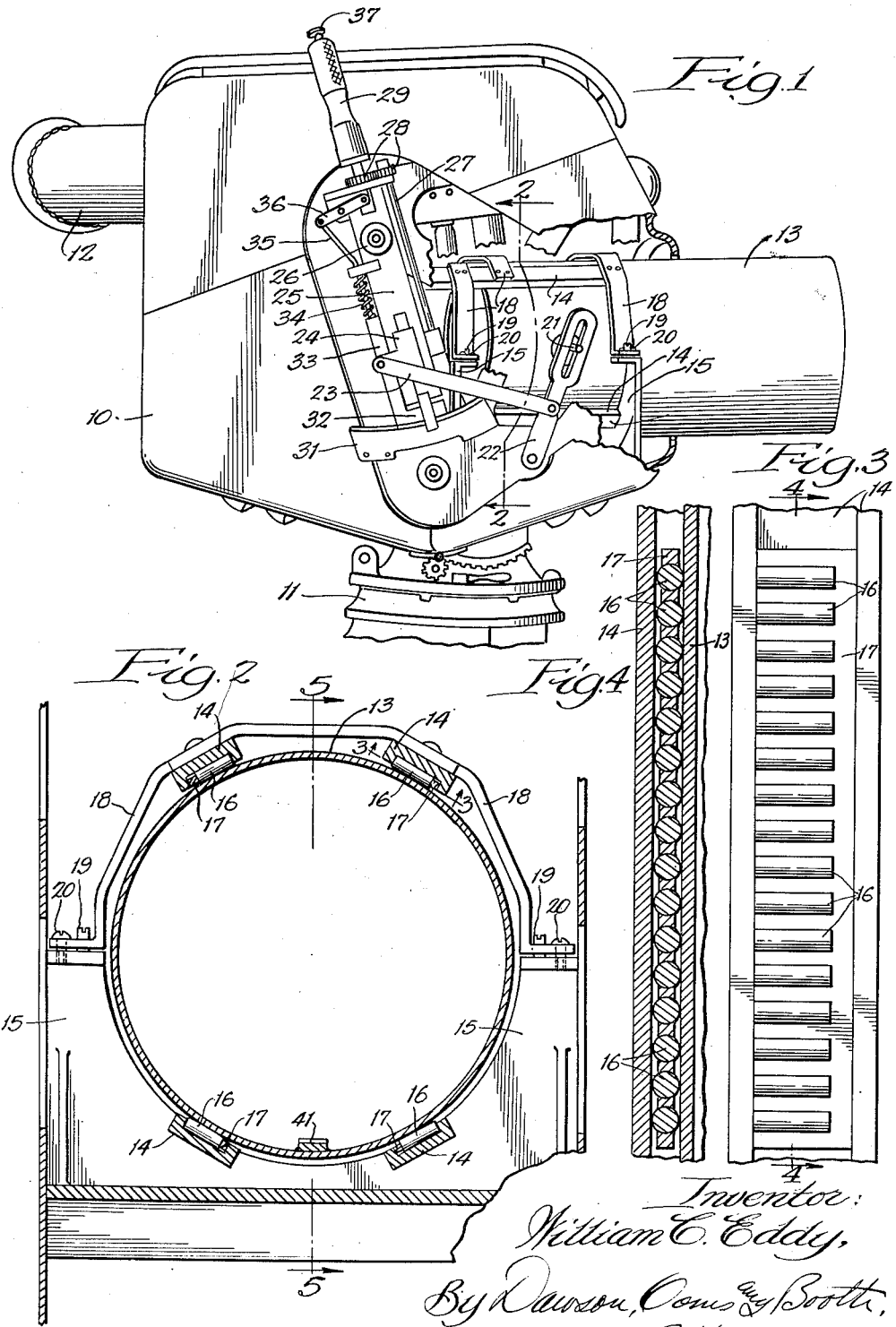

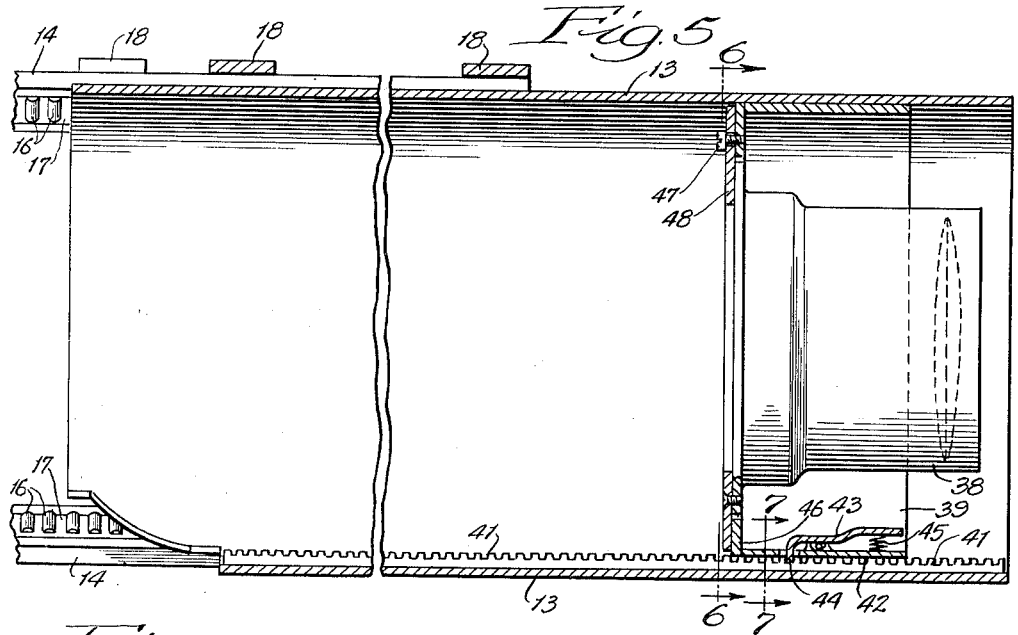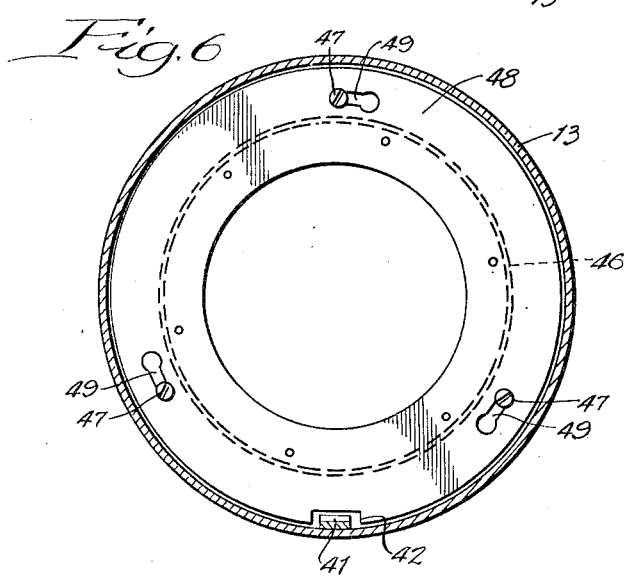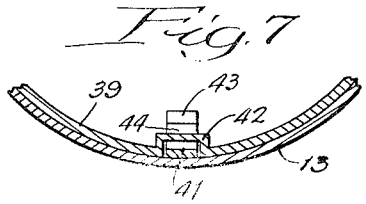

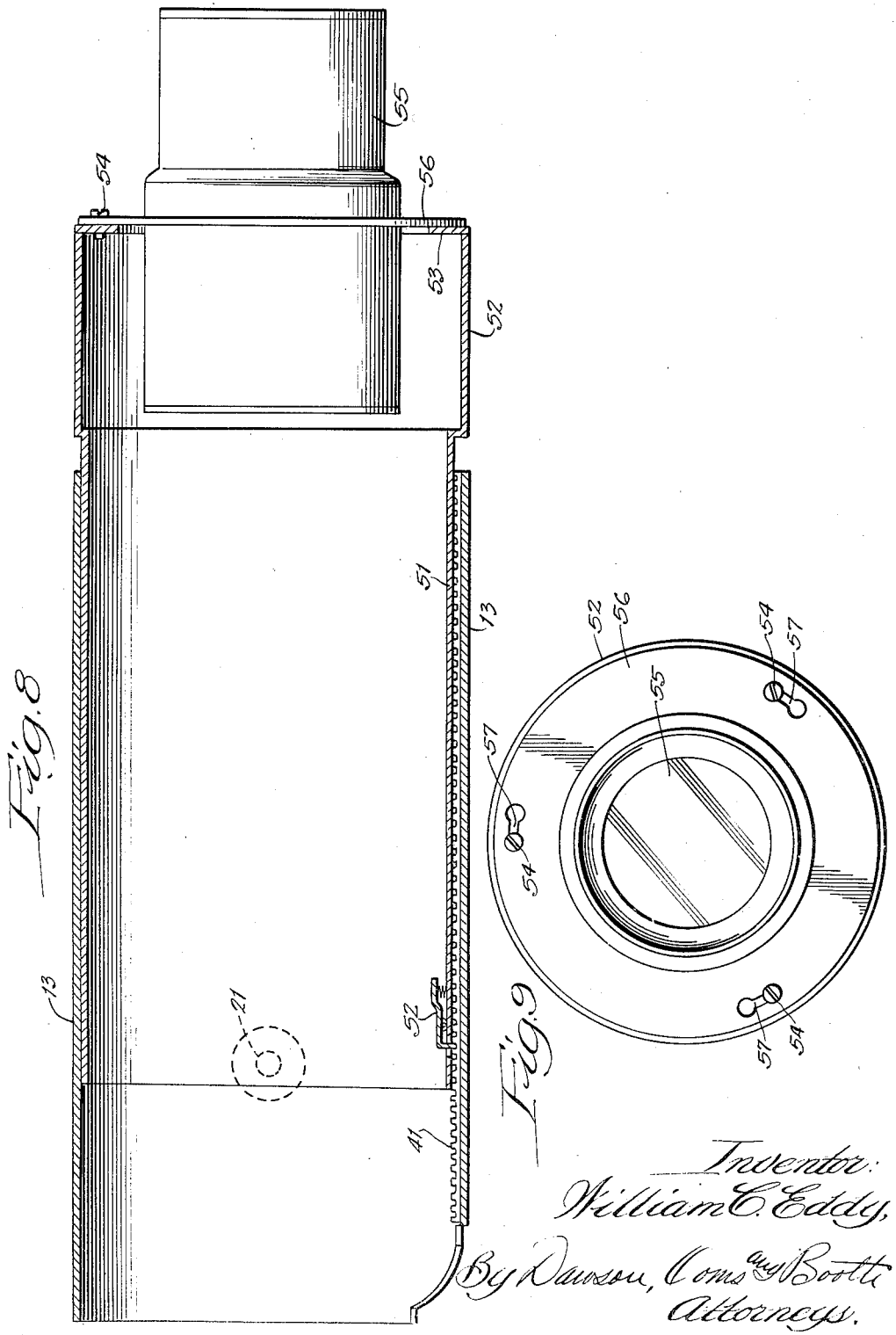

Patented July 31, 1945

2,380,829

UNITED STATES PATENT OFFICE 2,380,829

LENS MOUNTING

William C. Eddy, Michigan City, Ind., assignor to Balaban & Katz Corporation, Chicago, Ill., a corporation of Delaware Application February 28, 1942, Serial No. 432,763

6 Claims. (Cl. 88—57)

This invention relates to lens mountings and more particularly to an adjustable and interchangeable lens mounting adapted for use on television or like cameras.

One of the objects of the invention is to provide a lens mounting in which lenses of various types may readily be interchanged.

Another object of the invention is to provide a lens mounting in which the position of the lens can easily and quickly be adjusted to accommodate lenses of different focal lengths.

Still another object of the invention is to provide a lens mounting in which the position of the lens in the mounting may be adjusted and the mounting itself may also be adjusted in order to bring into proper focus objects at different distances from the lens.

Another object of the invention is to provide a lens mounting which is strong and rigid to support heavy lens systems and which can easily be adjusted over a wide range of focal distances.

The above and other objects and advantages of the invention will be apparent from the following description when read in connection with the accompanying drawings, in which:

Figure 1 is a side elevation with parts broken away of a television camera embodying the invention;

Figure 2 is an enlarged section on the line 2—2 of Figure 1;

Figure 3 is a section on the line 3—3 of Figure 2;

Figure 4 is a section on the line 4—4 of Figure 3;

Figure 5 is a section on the line 5—5 of Figure 2;

Figure 6 is a section on the line 6—6 of Figure 5;

Figure 7 is a partial section on the line 7—7 of Figure 5;

Figure 8 is a section similar to Figure 5, illustrating an alternative lens supporting structure; and Figure 9 is an end elevation of the structure of Figure 8.

The camera of Figure 1 comprises a body or cover 10 enclosing the electrical and optical mechanism and supported on a base 11. At the rear of the camera a view finder 12 is provided for the operator so that he can follow the objects to be photographed and can keep them properly in focus at all times. The camera illustrated is of the type more particularly disclosed and claimed in my co-pending application, Serial No. 432,765, filed February 28, 1942, but it will be understood that the present invention could be applied to many other types of cameras.

The optical lens of the camera is carried by a lens supporting tube 13 projecting through the front of the camera and slidably supported by a plurality of axially extending bearing bars 14 spaced circumferentially around the tube. As shown, four bearing bars are provided, and the two lower bearing bars are rigidly carried by yoke plates 15 forming a portion of the camera frame. Two such yoke plates are provided adjacent the opposite ends of the bearing bars, but it will be understood that this number could be varied as desired.

As shown, the bearing bars are formed with U-shaped channels to receive a plurality of anti-friction bearing rollers 16 supported in slots in a plate 17. With this construction, the plate 17 can be cut out at one side to form a comb-shaped member, with the rollers 16 received between the teeth and rotatable between the bearing bars 14 and the tube 13.

The upper bearing bars are adjustably supported by means of rigid metal straps 18 connected at their ends to the plates 15. As shown, each end of each strap is adjustably connected to the plates by means of compression screws 19 and tension screws 20, by means of which the spacing between the ends of the straps and of the plates can be adjusted. In this way, the bearing bars may be moved relatively together or apart to adjust the pressure between them and the supporting tube. While the straps 18 are substantially rigid, it will nevertheless be apparent that they may flex sufficiently to provide substantially uniform pressure between the several bearing bars and the tube and to compensate for irregularities in the tube.

The tube is adapted to be moved in the bearing bars by means of a focusing mechanism of the general type disclosed and claimed in my Patent No. 2,259,415. As shown, the tube is formed with a pin 21 projecting radially from one side thereof and received in an elongated slot in a lever 22 which is pivoted on the frame. A link 23 connects the lever eccentric to its pivot to a slide 24 slidably mounted on a focusing lever 25 which is pivoted at 26. The position of the slide on the lever 25 may be controlled by a screw 27 carried by the lever and engaging a threaded projection on the slide. The screw is adapted to be turned through gearing 28 by a handle 29 rotatably mounted on the upper end of the lever.

In order to hold the lever in adjusted position, a segment 31 is rigidly supported on the frame adjacent the lower end of the lever. The segment is adapted to be engaged by a friction shoe 32 carried by a bar 33 slidable on the lever 25. The bar is urged downwardly to press the shoe 32 into engagement with the segment 31 by a spring 34 and may be raised by a rod 35 connected to one end of a lever 36, which is adapted to be rocked by a push button 37 on the top end of the handle 29.

In operation of this mechanism with a lens supported in the carrier tube 13, the tube may be moved quickly to a rough focus position by depressing the button 37 and swinging the lever. When this is done, the link 23 will pull or push, as the case may be, on the lever 22, rocking it and causing it to shift the tube through its connection with the pin 21. After the tube has been moved to a rough focus position, the handle 29 may be turned to effect a precise focus. This is accomplished by sliding the slide 24 longitudinally of the lever, thereby pulling or pushing slightly on the link 23 due to the angle between the levers 25 and 22. By this means, a very exact focus can be obtained.

A lens, as indicated generally at 38, is adapted to be supported in the tube 13 in any one of a plurality of axially displaced positions in order to accommodate lenses of different focal lengths. For this purpose, the lens is carried by a sleeve or collar 39 slidable in the tube 13 and adapted to be latched in any one of a plurality of predetermined positions therein.

As shown, the sleeve may be latched in adjusted position in the tube by means of a pawl and ratchet mechanism, including an elongated toothed rack member 41 rigidly secured in the tube 13 at the lower part thereof. The sleeve 39 is channeled at one side, as indicated at 42, to fit over the rack, the rack and channel cooperating to prevent rotation of the sleeve in the tube. The tube carries within its outer end a pivoted pawl 43 having a down turned end 44 projecting through an opening in the sleeve and adapted to engage the rack. The pawl is normally urged to engaged position by a spring 45, and may be released by pressing on the end of the pawl which forms a finger piece.

The tube 13 may, if desired, be calibrated on its interior to indicate the proper position for lenses of different focal lengths. It will be understood that the position of the lenses as determined by the pawl and rack mechanism need not be extremely accurate, since proper focusing can be obtained by adjustment of the tube 13 through the focusing mechanism described above. The construction as shown, however, enables the lens mounting to accommodate lenses of widely divergent focal lengths by properly adjusting the lens in the carrier tube.

In order that the lenses may readily be interchanged, a detachable connection is provided between the individual lenses and the sleeve or collar 39. As shown, such mechanism is formed by a flange 46 on one end of the tube 39, carrying a plurality of circumferentially spaced headed screws 47. The lens 38 is secured to a similar flange 48, adapted to fit against the flange 46 and having therein a series of key hole slots 49. With this construction, the lens can quickly be secured to the sleeve by placing the key hole slots over the screws 47 and turning the lens slightly to move the screws 47 into the small ends of the slots. If desired, complete rigidity may be obtained by tightening the screws 47.

Figure 8 illustrates an alternative lens supporting structure adapted to be utilized in place of the sleeve 39 for carrying a telephoto lens or other lens of long focal length. As shown, the tube 13 slidably receives an elongated tube 51 channeled out to fit over a rack 41, and having on its interior a pawl 52 engageable with the rack. The outer end of the sleeve 51 is enlarged slightly, as indicated at 52, and is formed with a radial flange 53 carrying a plurality of headed screws 54. The lens indicated at 55 has a peripheral flange 56 fitting against the flange 53 and secured thereto by means of key hole slots 57. With this construction, the lens may be supported beyond the end of the carrier tube 13 at a substantial focal distance from the screen of the iconoscope tube.

While one embodiment of the invention has been shown and described in detail, it will be understood that this is illustrative only, and is not to be taken as a definition of the scope of the invention, reference being had for this purpose to the appended claims.

What is claimed is:

1. A lens mounting for a camera comprising a tubular lens carrier having a smooth cylindrical exterior surface, means forming an axial series of ratchet teeth along one side of the lens carrier on the interior thereof, a tubular sleeve adapted to fit slidably in the lens carrier and to support a lens therein, and a pawl pivotally mounted in the interior of the sleeve and having an out-turned end projecting through an opening in the sleeve and engaging the ratchet teeth to hold the sleeve in adjusted position in the lens carrier.

2. A lens mounting for a camera comprising a tubular lens carrier, means forming an axial series of ratchet teeth along one side of the lens carrier, a tubular sleeve adapted to fit slidably in the lens carrier and to support a lens therein, said sleeve having a radially extending flange, a lens having an external peripheral flange fitting against the sleeve flange, one of said flanges having a series of key shaped openings therein, a series of headed projections on the other flange cooperating with the openings to secure the flanges together and a pawl on the sleeve engageable with the ratchet teeth adjustably to lock the sleeve in the lens carrier.

3. A lens mounting for a camera comprising an elongated tubular lens carrier focusing means for sliding the lens carrier axially to various adjusted positions, a tubular sleeve slidably fitting in the lens carrier, interengaging means on the lens carrier and sleeve to prevent relative rotation therebetween, quick releasable interengaging means on the lens carrier and tube to latch them against relative sliding in any one of a plurality of adjusted positions, a lens, and interengaging means on the lens and sleeve actuated by relative rotation therebetween to secure the lens to the sleeve.

4. A lens mounting for a camera comprising a lens carrier tube, means for mounting a lens in the tube, and means for slidably supporting the tube including a plurality of bearing bars arranged axially of the tube around the periphery thereof, and means adjustably supporting the bearing bars to move them relatively toward or away from each other so that the pressure of the bearing bars against the tube can be adjusted.

5. A lens mounting for a camera comprising a lens carrier tube, means for mounting a lens in the tube, and means for slidably supporting the tube including a plurality of bearing bars arranged axially of the tube around the periphery thereof, a yoke rigidly supporting at least one of the bearing bars, a strap supporting another bearing bar, and means adjustably connecting the ends of the strap to the yoke.

6. A lens mounting for a camera comprising a tubular lens carrier, means forming an axial series of ratchet teeth along one side of the lens carrier, a tubular sleeve adapted to fit slidably in the lens carrier and to support a lens therein, a pawl on the sleeve engageable with the ratchet teeth to lock the sleeve in the lens carrier, a plurality of bearing bars arranged axially of the lens carrier around the periphery thereof, a pair of rigid yokes supporting two of the bearing bars at points spaced axially thereof, a pair of straps connected to two other bearing bars at points spaced axially thereof, and means adjustably connecting the ends of the straps to the yokes.

WILLIAM C. EDDY.